United States Patent [19]

Okada et al.

[11] Patent Number: 4,919,520

[45] Date of Patent: * Apr. 24, 1990

[54] LIQUID CRYSTAL EYEGLASS

[75] Inventors: Takao Okada, Hachioji; Takeaki Nakamura, Hino; Kazuo Nakamura, Hachioji; Kimihiko Nishioka, Hachioji; Toshihito Kouchi, Tama; Hiroyuki Yamamoto, Hachioji; Hideo Tomabechi, Higashiyamato, all of Japan

[73] Assignee: Olympus Optical Company, Japan

[*] Notice: The portion of the term of this patent subsequent to Jan. 3, 2006 has been disclaimed.

[21] Appl. No.: 273,238

[22] Filed: Nov. 18, 1988

Related U.S. Application Data

[63] Continuation of Ser. No. 770,051, Aug. 27, 1985, Pat. No. 4,795,248.

[30] Foreign Application Priority Data

Aug. 31, 1984 [JP] Japan ............................... 59-183087
Aug. 31, 1984 [JP] Japan ............................... 59-183088
Aug. 31, 1984 [JP] Japan ............................... 59-183091
Aug. 27, 1985 [JP] Japan ............................... 60-219839

[51] Int. Cl.⁵ .................................................. G02F 1/13
[52] U.S. Cl. ........................... 350/331 T; 350/331 R; 350/347 R; 350/347 V; 350/335

[58] Field of Search ........... 350/331 R, 331 T, 347 R, 350/347 V, 335; 351/41, 49, 58, 168

[56] References Cited

U.S. PATENT DOCUMENTS

4,756,605 7/1988 Okada et al. .................... 350/347 V
4,795,248 1/1989 Okada et al. .................... 350/347 V

FOREIGN PATENT DOCUMENTS

58-50339 3/1983 Japan .
0110117 5/1986 Japan ............................... 350/347 V
0140925 6/1986 Japan ............................... 350/331 T
0047026 2/1987 Japan ............................... 350/331 T

*Primary Examiner*—Stanley D. Miller
*Assistant Examiner*—Trong Quang Phan
*Attorney, Agent, or Firm*—Louis Weinstein

[57] ABSTRACT

Liquid crystal eyeglasses include a detector for detecting a physical quantity which varies with the temperature of the liquid crystal, the orientation of molecules of the liquid crystal or a change in the refractive index of the liquid crystal. The voltage applied to the liquid crystal is controlled in accordance with an output signal from the detector, thus compensating for a change in the refractive index of the liquid crystal which is attributable to a temperature change and maintaining the refractive index constant.

23 Claims, 11 Drawing Sheets

F I G. 21
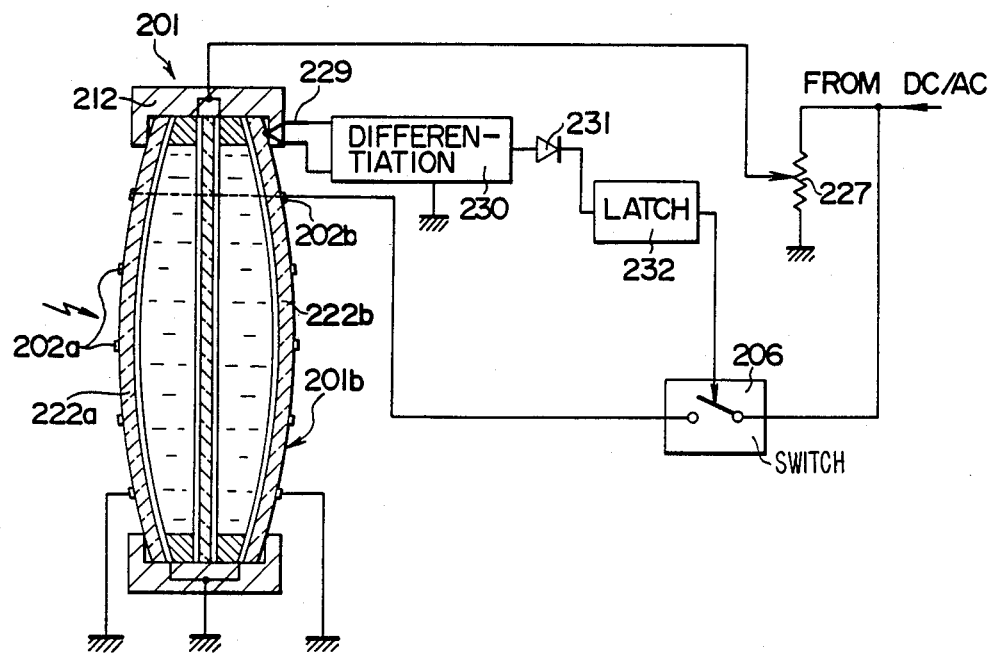
F I G. 22
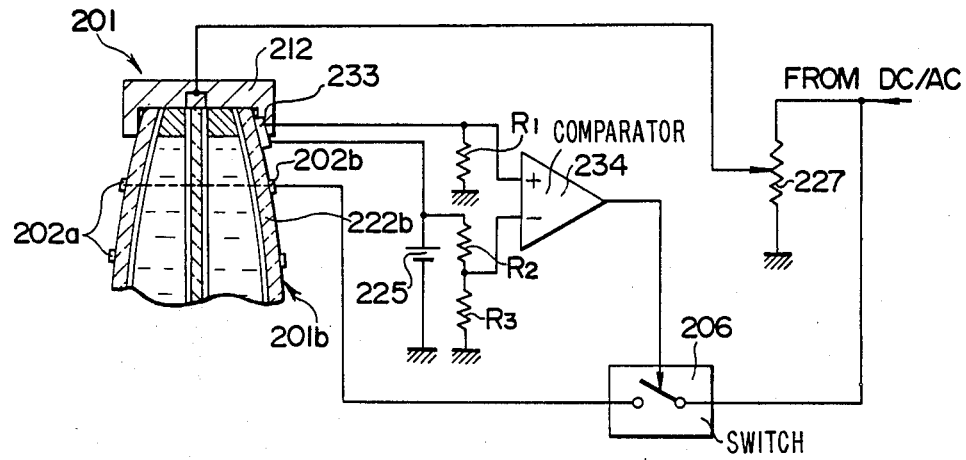

LIQUID CRYSTAL EYEGLASS

This is a continuation of application Ser. No. 770,051, filed Aug. 27, 1985, now U.S. Pat. No. 4,795,248.

BACKGROUND OF THE INVENTION

The invention relates to a liquid crystal eyeglass, and more particularly, to a liquid crystal eyeglass which is capable of automatically preventing a deviation in the focal length from a preset value from occurring in response to a temperature change and also to a power supply which feeds a voltage applied to the liquid crystal.

When the function of adjusting the focal length in the eyeballs is degraded as with presbyopia, eyeglasses of different focal lengths which may be used for near and far distances are commonly used, and must be changed depending on the situation. There are some single eyeglass lenses which are partly provided with a region having a different focal length so that suitable ranges at near and far distances can be covered. However, it is only in a portion of the field of sight which is in focus, causing a painful view.

When the crystalline humor is extracted because of a disease such as cataract, several eyeglasses having different focal lengths must be provided and must be chosen in use depending on the situation, thus causing an inconvenience.

To accommodate for this, there is disclosed in Japanese Patent Publication No. 50,339/1983 to provide a variable focal length lens comprising a voltage controlled liquid crystal. This construction operates with a low voltage and with a low power dissipation, and can be conveniently used as far as this aspect is concerned. However, when it is used as eyeglasses, the refractive index of the liquid crystal varies with a temperature change and hence prevents a clear sight. It is understood that the environmental temperature greatly varies from season to season and also undergoes a large variation between the outdoor and the indoor condition which is air conditioned during the summer or winter. Thus, the described arrangement disadvantageously requires an adjustment in the applied voltage in response to any change in the surrounding temperature. As another drawback, a bulky power supply box for the liquid crystal must be contained as in a pocket of a suit which is typically located in the region of the breast.

SUMMARY OF THE INVENTION

The present invention has been made in consideration of the described prior art, and has for its principal object the provision of a liquid crystal eyeglass including compensation means which prevents a focal length from varying from a preset value in response to any change in the environmental temperature, by detecting a physical quantity which varies with a change in temperature or with a change in orientation of molecules of a liquid crystal.

It is another object of the invention to provide liquid crystal eyeglasses employing a solar cell which charges a power source for control means which compensates a liquid crystal against temperature changes.

In accordance with the invention, a voltage is applied to a liquid crystal so as to provide a variable focal length lens. Means for compensating for a change in the focal length which is attributable to temperature changes responds to an output signal from detector means which detects the temperature, the molecular orientation or other physical quantity to control the voltage applied. In this manner, the difficulty that a change in the environmental temperature shifts the focus to prevent a clear sight is overcome. Single eyeglasses may cove a plurality of focal lengths, thus avoiding the need to carry about a plurality of eyeglasses or changing them as needed.

BRIEF DESCRIPTION OF THE DRAWINGS

FIGS. 21 and 22 are cross sections, to an enlarged scale, of an essential part of other forms of anti-fogging means which may be used with liquid crystal eyeglasses, together with a circuit diagram of the anti-fogging means;

DESCRIPTION OF PREFERRED EMBODIMENTS

Figure 1:
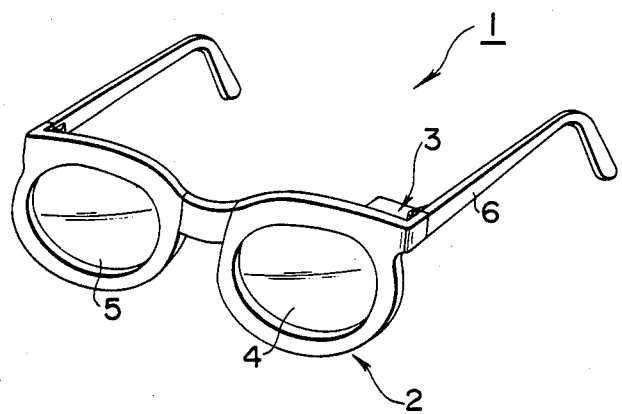
FIG. 1 is a perspective view of exemplary liquid crystal glasses to which the invention may be applied.
Figure 2:
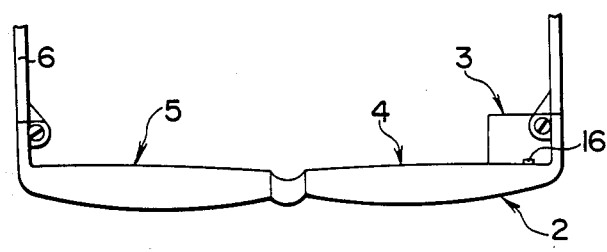
FIG. 2 is a top plan view of the eyeglasses shown in FIG. 1.

Referring to FIGS. 1 and 2, there is shown liquid crystal eyeglasses 1 to which the invention is applied. It includes an eyeglass assembly 2, and a control circuit 3 which compensates for any change in the focal length as a result of a change in the refractive index, caused by a temperature change of the liquid crystal within the eyeglass assembly 2.

The eyeglass assembly 2 includes a left and a right lens portions 4, 5 which are substantially disc-shaped. These lens portions are fitted and fixed in left and right hollowed-out portions of a lens frame 6, which additionally includes a pair of left and right bows which are pivotally connected with the hollowed-out portions and adapted to engage the ears. The control 3 is mounted on one of the hollowed-out portions, for example. Either left or right lens portion 4, 5 is constructed in a manner as shown in exaggerated form in FIG. 3, for example.

Figure 3:
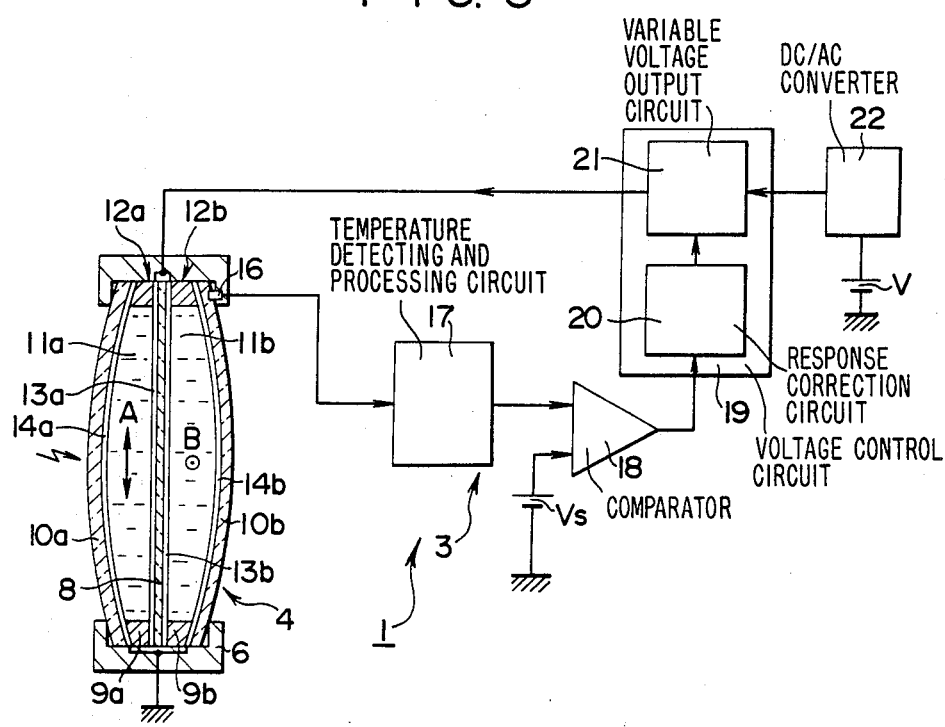
FIG. 3 is a cross section, to an enlarged scale, of essential parts of liquid crystal eyeglass according to a first embodiment of the invention together with a schematic diagram of temperature compensation means.

FIG. 3 shows a first embodiment of the invention. It should be noted that temperature compensation means which is used in the first embodiment as well as in a second embodiment shown in FIG. 5 and a third embodiment shown in FIG. 6 employ a temperature sensor and voltage control means. Referring to FIG. 3, a common transparent plate 8 which may be formed of a glass pane or the like, is secured to the frame 6, and a pair of spacers 9a, 9b are applied to the opposite sides thereof. A pair of transparent plates 10a, 10b each having a convex surface, for example, are spaced from the plate 8 by the spacers 9a, 9b defining spaces in which liquid crystals 11a, 11b which exhibit an identical response are confined, thus providing a pair of variable focal length lenses 12a, 12b.

When no voltages are applied to these lenses 12a, 12b, the molecules of the liquid crystal are aligned in an orientation parallel to the transparent plate 8, with directors (which coincide with the optical axes representing the direction of the mean orientation of the liquid crystals being perpendicular between the lenses 12a and 12b. Thus, a rubbing treatment is applied so that the orientations of the molecules of the liquid crystal in the lenses 12a and 12b are in a direction indicated by a double-ended arrow A and in a direction B which is perpendicular to the direction A, as shown in FIG. 3, with the respective directions A and B being perpendicular to the direction of incidence of light.

The opposite surfaces of the common transparent plate 8 are coated with transparent electrodes 13a, 13b, while the internal surfaces of the individual transparent plates 10a, 10b, located in opposing relationship with the transparent plate 8 and which may be formed of glass panes, are also provided with transparent electrodes 14a and 14b, respectively. The outer electrodes 14a and 14b are connected together by a lead wire and connected to a ground terminal. The inner electrodes 13a and 13b are also connected together. The variable focal length lenses 12a and 12b constructed in the manner described above provide a variable focal length lens assembly which obviates the use of a polarizer as will be described below.

Incident light can be resolved into a pair of mutually orthogonal polarization components, namely, one component being in the direction of orientation indicated by the arrow A and produced by the lens 12a and the other in the direction of orientation indicated by the dot-in-circle B and produced by the other lens 12b. When one component of the incident light which represents a polarization component parallel to the direction A of orientation of the lens 12a impinges upon the lens 12a, such ray component acts as an extraordinary ray with respect to the lens 12a. Accordingly, when a voltage is applied to the lens 12a under this condition, the molecule of the liquid crystal will gradually change its orientation toward a direction which is perpendicular to the surface of the electrode, with the consequence that the apparent refractive index of the lens 12a, with respect to the extraordinary ray component, changes from a value corresponding to the extraordinary ray to a value which corresponds to an ordinary ray, thus producing an effect of providing a variable focal length.

Such component which acts as an extraordinary ray with respect to the lens 12a acts as an ordinary ray with respect to the lens 12b, the apparent refractive index of which therefore does not change, producing no change in the focal length thereof. Accordingly, such ray proceeds directly straightforward. On the other hand, when the other component of the incident light which acts as ordinary ray with respect to the lens 12a impinges, there occurs no change in the apparent refractive index of the lens 12a, the focal length of which therefore does not vary. However, such ray acts as an extraordinary ray with respect to the lens 12b, and hence its apparent refractive index changes, producing a change in the focal length thereof. It will be appreciated that because an equal voltage is applied to both lenses 12a and 12b, there is produced a change in the focal length of an equal magnitude for the respective lenses by the respective polarization components. Hence, by superimposing the pair of variable focal length lenses 12a and 12b so that their optical axes are orthogonal to each other, the combination operates as a variable focal length lens for any polarized light of any direction, thus providing a change in the focal length independently of the direction of polarization of the incident light while avoiding the use of a polarizer. In other words, a lens which exhibits a high optical efficiency for natural light which does not represent a plane polarization can be obtained without using a polarizer.

It will be noted that in each lens 12a and 12b, the liquid crystal 11a or 11b has a thickness in the middle portion thereof which is different from the thickness around the peripheral region. Accordingly, the electric field which is produced by the application of a voltage is different between the middle region and the peripheral region. However, it is established that the refractive index depends on the magnitude of the voltage applied, but not on the electric field applied. Accordingly, a lens having a uniform change in the refractive index can generally be constructed by controlling the voltage applied.

As shown, a temperature sensor 16 such as a thermistor, a thermocouple or a resistive temperature sensor is mounted around one of the lens portions, as shown at 4, so as to enable the temperature of the lens 12b to be detected. Where a thermistor is used as such sensor 16, it may be connected in series with a reference resistor across a constant voltage source of a temperature detecting and processing unit 17 which then derives a voltage signal in the form of a resistance variation with temperature. (Obviously, a Wheatstone bridge circuit may be used, if desired.) Where a thermocouple is used as sensor 16, an output temperature is obtained as a differential signal against a compensated cold contact (constant temperature contact) of the unit 17. In either instance, an output from the unit 17 is fed to a comparator 18 where it is compared against a voltage Vs corresponding to a given focal length. A differential output from the comparator 18 represents a deviation from a given temperature at which the focal length is preset.

Accordingly, the differential output is fed to an applied voltage control circuit 19 including a response correction circuit 20 which provides a correction against temperature, and a variable voltage output circuit 21, an output of which is applied to both inner electrodes 13a and 13b. A DC/AC converter 22 converts a d.c. output from a d.c. source V into a corresponding alternating voltage, and the variable voltage output circuit 21 delivers a variable voltage level or amplitude of the alternating voltage in accordance with a control voltage which is applied to a control terminal thereof. It will be appreciated that an oscillator may be used in place of the converter 22. At a given temperature, a given voltage is delivered to be applied to the respective electrodes 13a, 13b to control the refractive indices of the liquid crystal lenses 11a, 11b so that the respective lens portions 4, 5 have a given focal length. In addition, a signal detected by the temperature sensor 16 is utilized to derive an output voltage which is effective to compensate for a change in the refractive indices attributable to a temperature change of the liquid crystals 11a, 11b, through the control of the orientation of the molecules of the liquid crystals, thus preventing a change in the focal length from occurring.

When PCB (pentyl cyano biphenyl) which is a nematic crystal, is used for the liquid crystals 11a and 11b, it is recognized that in a temperature region around room temperatures, as the temperature rises, the refractive index decreases, in particular, with respect to the extraordinary ray which has a strong dependence upon the temperature, thus increasing the focal length. Such change in the focal length which is attributable to the temperature change can be prevented by reducing the magnitude of the voltage applied to increase the refractive index, thus compensating for a change in the focal length attributable to the temperature change. Since temperature change normally occurs in a range of several tens of degrees, the correction circuit 20 is designed to permit an accurate compensation for changes in the focal length which result from a temperature change across such a range of temperatures.

Figure 4:
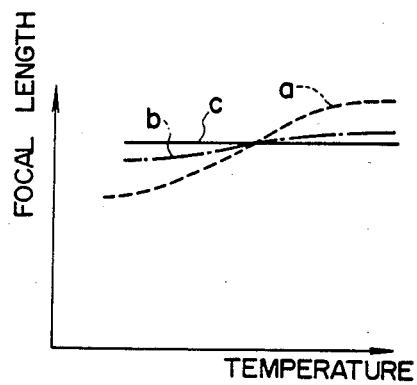
FIG. 4 graphically shows the relationship between focal length and temperature.

In an arrangement in which the focal length changes as indicated by a broken line curve a in FIG. 4 with temperature change, it is generally difficult, as indicated by a phantom line curve b in FIG. 4, to provide a perfect compensation against temperature changes by feeding the output signal from the comparator 18 directly to the variable voltage circuit 21 so as to control the output voltage therefrom. However, in the first embodiment, the response correction circuit 20 is designed to remove such deviation, thus eliminating any influence of temperature changes, as indicated by a solid line curve c of FIG. 4.

Accordingly, when the first embodiment as constructed above is used in an environment which undergoes a varying temperature, any change in the refractive indices of the liquid crystals 11a and 11b which define the respective lens portions 4 and 5, respectively, can be automatically compensated for, by automatically controlling the voltage applied from the voltage control circuit 19 in response to a detection output from the temperature sensor 16.

Figure 5:
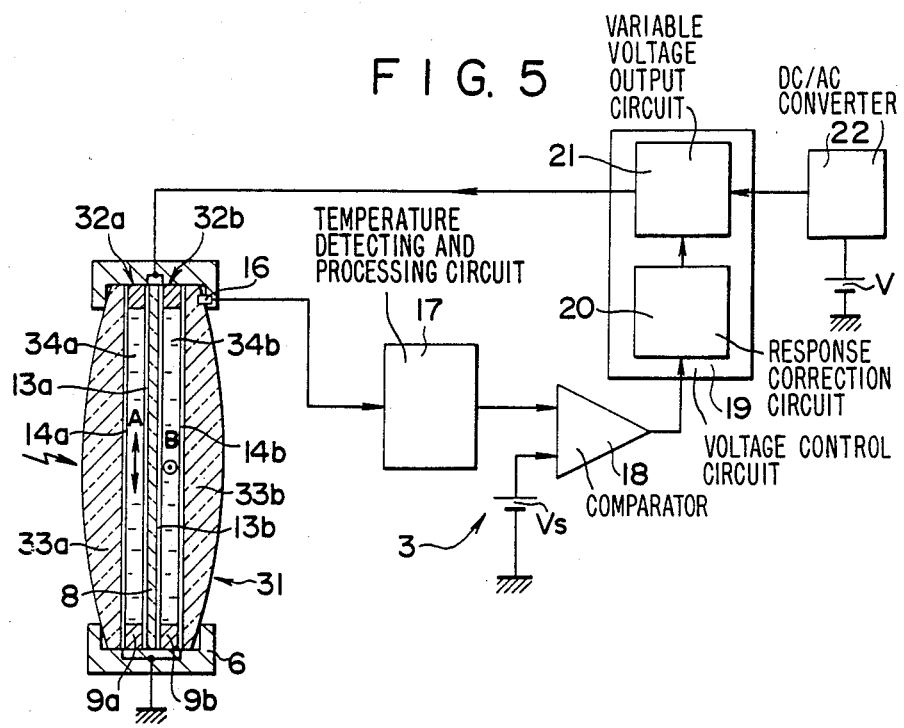
FIG. 5 is a cross section, to an enlarged scale, of essential parts of a liquid crystal eyeglass according to a second embodiment of the invention, together with a schematic diagram of temperature compensation means.

FIG. 5 shows a second embodiment of the invention where each of the left and right lens portions 31 (only one being shown) includes a pair of variable focal length lenses 32a and 32b, each of which comprises planoconvex lenses 33a and 33b, respectively. Thus, in the variable focal length lenses 12a and 12b shown in FIG. 3, the transparent plates 10a and 10b are replaced by the planoconvex lenses 33a and 33b, respectively, with liquid crystals 34a and 34b being contained in spaces which are defined by parallel plates. The combination of the liquid crystals 34a and 34b which exhibit variable refractive indices and the planoconvex lenses 33a and 33b provide the variable focal length lenses 32a and 32b, respectively. In other respects, the arrangement is similar to the first embodiment, and this arrangement operates in the same manner to achieve a similar effect as mentioned above. It will be appreciated that with this embodiment, if the liquid crystals 11a and 11b shown in the first embodiment exhibit a dependence upon the electric field as well as a dependence upon the voltage, a uniform thickness of the respective liquid crystals 34a and 34b throughout their entire region prevents any problem.

Figure 6:
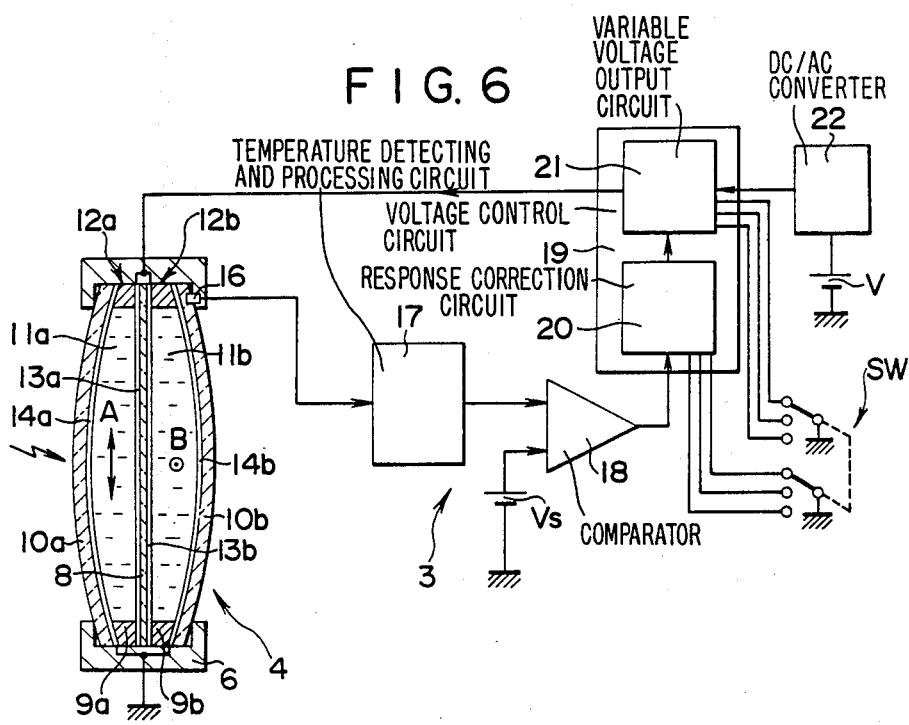
FIGS. 6 to 10 are enlarged cross sections of liquid crystal eyeglass according to a third to a seventh embodiment of the invention, together with schematic diagrams of their associated temperature compensation means.

FIG. 6 shows a third embodiment of the invention which allows a given number of selected focal lengths to be manually established, such as a near distance, a median distance and a far distance, for example, rather than establishing a single focal length as in the first embodiment. It should be understood that the number of focal lengths which can be established is not limited to three.

Specifically, a switch SW allows different voltages to be outputted from the variable voltage circuit 21 at a given temperature. It should be understood that to maintain a focal length which is selected, the response correction circuit 20 is controlled by a ganged operation of the switch so that the selected focal length can be maintained in the presence of a temperature change. It will be appreciated that the liquid crystal eyeglasses according to the third embodiment is preferred for use by a person who has his crystalline humor removed because of cataract, for example, allowing the single eyeglasses to be used without the need for the provision of plurality of eyeglasses. This embodiment is also suitable for use by a person who suffers from the loss of visibility controlling capability.

Figure 7:
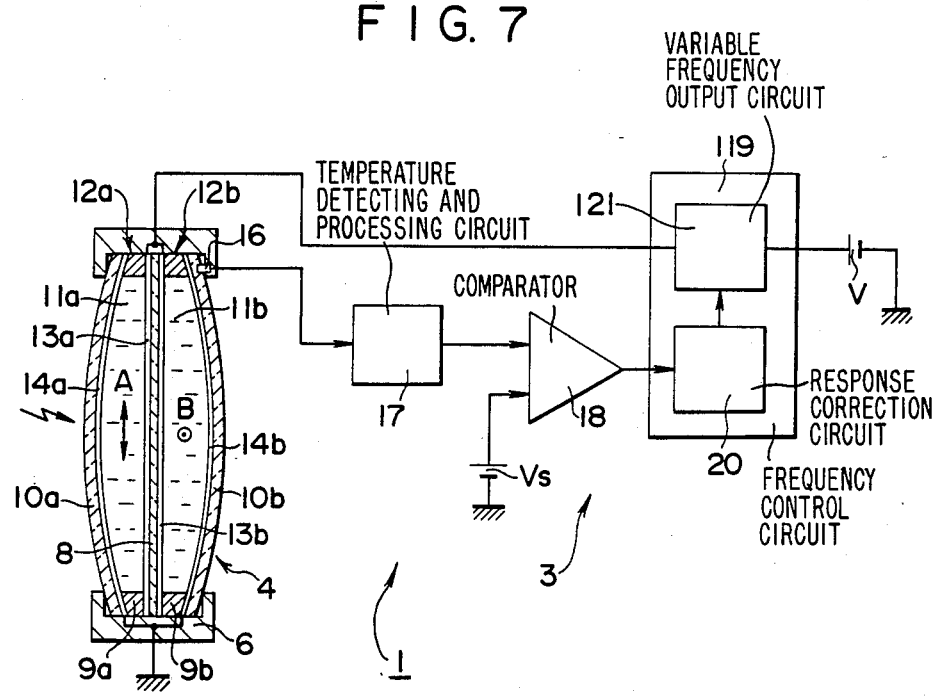
Figure 8:
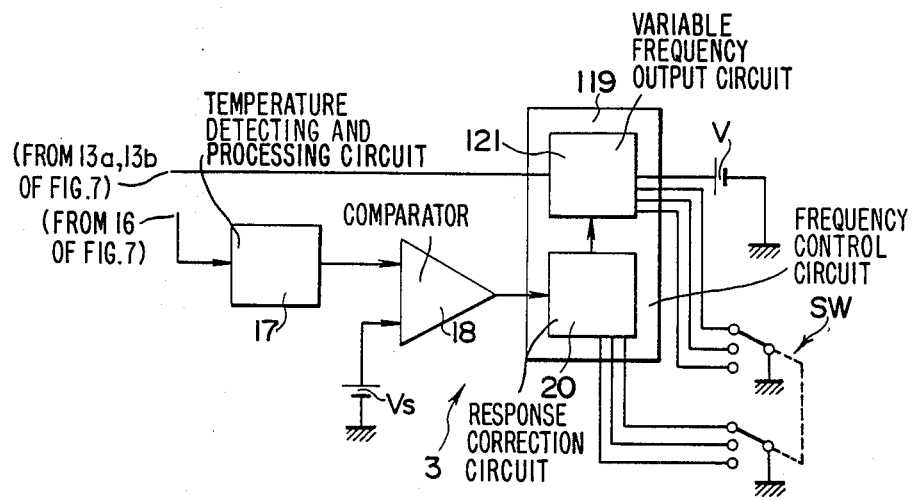
Figure 9:
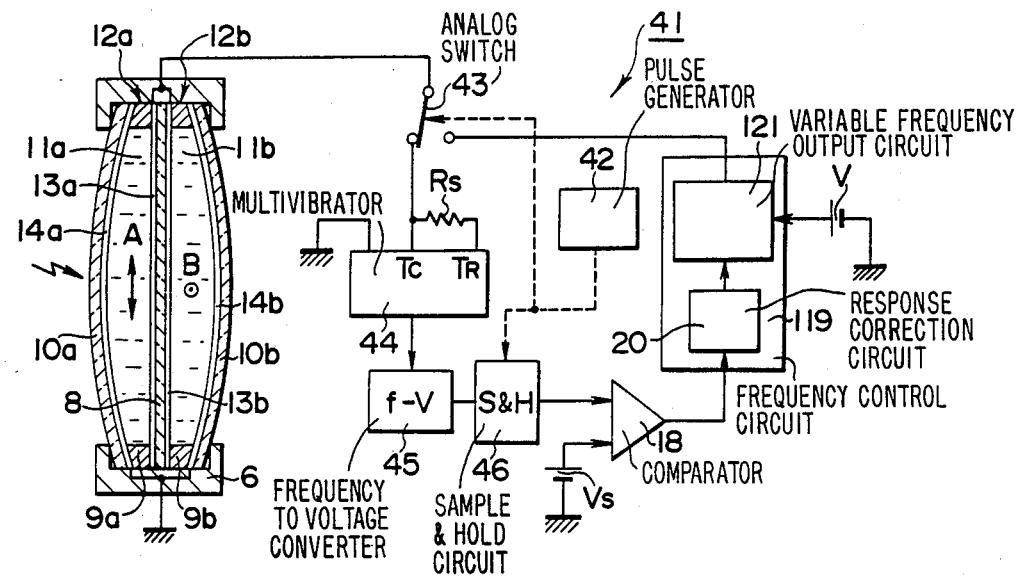

FIG. 7 shows a fourth embodiment of the invention, which employs a temperature sensor or orientation detector in combination with frequency control means to provide the temperature compensation means, as in a fifth embodiment shown in FIG. 8 and a sixth embodiment shown in FIG. 9.

The frequency control means responds to a detection output from the temperature sensor or the orientation detector by varying the frequency of a voltage applied to the liquid crystals, thus compensating for a change which occurs in the refractive indices of the liquid crystals due to a temperature change, by controlling the orientation in the liquid crystal. It will be noted by comparison with the first to the third embodiment that the variable voltage circuit 21 is replaced by a variable frequency output circuit 121 of a frequency control circuit 119. In other respects, the arrangement remains unchanged from the previous embodiments, and therefore will not be specifically described.

Specifically, in the fourth embodiment shown in FIG. 7, the differential output from the comparator 18 is inputted to the frequency control circuit 119. In this arrangement, the DC/AC converter 22 which converts a d.c. voltage from the source V into an alternating voltage is eliminated. The frequency control circuit 119 includes the response correction circuit 20 mentioned above and the variable frequency output circuit 121, the output of which is applied to the electrodes 13a and 13b which are not grounded or the inner electrodes.

The variable frequency output circuit 121 is adapted to develop a frequency which depends on the voltage level applied to a control input thereof, from the d.c. voltage supplied from the source V. For example, it may comprise a voltage controlled oscillator. Oscillation waves from the circuit 121 are applied to the liquid crystals 11a and 11b, thereby controlling the orientation of the molecules therein or the refractive indices thereof so that the lens portions 4 and 5 exhibit a preset focal length. In addition, a detection output from the temperature sensor 16 is utilized to provide oscillation waves which are effective to compensate for any change in the refractive indices, and hence a corresponding change in the focal length due to a temperature change of the respective liquid crystals 11a and 11b. By way of example, where a nematic liquid crystal is used for the liquid crystals 11a and 11b, it is recognized that in a temperature region around room temperature, as the temperature rises, the refractive index decreases, in particular, with respect to the extraordinary ray which has a strong dependency upon the temperature, thus increasing the focal length. Such change in the focal length, which is attributable to the temperature change, can be compensated for or prevented by lowering or reducing the frequency of the voltage applied (or increasing the frequency, depending on the kind of the liquid crystal), thus increasing the refractive index. Since the temperature usually varies over a range of several tens of degrees, the response correction circuit 20 is designed to provide an accurate compensation for a temperature change over such range.

By way of example, where the focal length varies with temperature as indicated by the broken line curve a of FIG. 4, an output signal from the comparator 18 may be applied to the variable frequency output circuit 121 to provide a controlled frequency of the output voltage thereof. However, such frequency control is generally incapable of achieving a perfect compensation against temperature change, as indicated by the resulting response shown by the phantom line curve b of this Figure. However, the provision of the response correction circuit 20 in the fourth embodiment allows any adverse influence of such temperature change to be compensated for or eliminated, as indicated by the solid line curve c of FIG. 4.

When the fourth arrangement is used in a varying temperature environment, if the refractive indices of the liquid crystals 11a, 11b which form the individual lens portions 4, 5 vary, the temperature of the liquid crystals is detected by the temperature sensor 16 and feeds a detection signal which in turn controls the output frequency from the frequency control circuit 119, thereby automatically changing and controlling the frequency of the voltage applied so as to remove any change in the focal length which results from the temperature change.

FIG. 8 shows a fifth embodiment of the invention in which the focal length which is preset in the fourth embodiment can be manually changed so as to cover a near distance, a median distance and a far distance.

The focal length can be changed by operating a switch SW, thereby varying the frequency of the voltage which is outputted from the variable frequency output circuit 121 for a given temperature. The response correction circuit 20 is switched in a ganged manner so as to maintain the focal length which is once established in the event the temperature changes. This embodiment is also preferred for use by a person whose crystalline humor has been removed for reason of cataract, and dispenses with the need to provide a plurality of eyeglasses, allowing single eyeglasses to be used. It will be appreciated that the number of focal lengths which can be switched may be greater or less than three, as desired.

FIG. 9 shows a sixth embodiment of the invention in which a temperature compensation unit 41 for the liquid crystal eyeglasses does not include the temperature sensor 16 as used in the fourth embodiment for directly detecting the temperature of the liquid crystals, but includes means which detects a capacitance, a physical quantity which varies with a change in the orientation of the molecules of the liquid crystal.

Specifically, it includes a pulse generator 42 which periodically delivers pulses having a reduced duration, which changes an analog switch 43. The switch 43 is normally thrown to a contact which is connected to the frequency control circuit 119, but when it is switched by the pulse, the switch connects the non-grounded electrodes 13a, 13b to a capacitance terminal Tc of a capacitance detecting multivibrator 44. The multivibrator 44 includes a resistance terminal $T_R$, to which a resistor Rs having a suitable value is connected. In this manner, the oscillation frequency f of pulse waves which are outputted from the multivibrator 44 varies in accordance with the values of the resistor Rs and the capacitance of the liquid crystal which are connected to the terminals $T_R$ and Tc, respectively. Because the resistor Rs has a constant value, the dielectric constant of the liquid crystals 11a, 11b which varies depending on the orientation of the molecules thereof in accordance with the temperature to change the capacitance which they exhibit, causes the oscillation frequency f from the multivibrator 44 to be changed.

The output of the multivibrator 44 is applied to a frequency-to-voltage converter 45 which converts an input frequency into a corresponding voltage as an output. The output voltage from the converter 45 is applied to a sample-and-hold circuit 46 which samples the voltage in response to the falling edge of the pulse supplied from the pulse generator 45 and holds the resulting value. As in the fourth embodiment, the output of the sample-and-hold circuit 46 is fed to one input of the comparator 18. In this manner, it is compared against a reference voltage Vs supplied to the other input of the comparator 18, the output of which is applied to the frequency control circuit 119, thus controlling the frequency of the a.c. voltage applied to the liquid crystals 11a, 11b so as to maintain the given focal length in the presence of temperature changes.

In operation, a periodic pulse having a reduced duration causes the switch 43 to be thrown for connection to the multivibrator 44, whereupon the multivibrator 44 outputs a pulse train with a period which depends on the value of capacitance exhibited by the liquid crystals 11a, 11b filled between the electrodes 13a, 14a and 13b, 14b. The pulse train is converted into a corresponding voltage by the converter 45, and the voltage is sampled by the sample-and-hold circuit 46, which delivers an output for comparison against the reference voltage Vs within the comparator 18. The output from the comparator 18 is effective to control the output frequency from the frequency control circuit 119, whereby an a.c. voltage having a controlled frequency can be applied to the electrodes 13a, 13b when the switch 43 is returned to the other position. In this manner, in the presence of temperature changes of the liquid crystals 11a, 11b, the focal length of the individual lens portions can be maintained constant.

It will be appreciated that the detection of the capacitance occurs periodically with a reduced pulse interval, thereby substantially preventing any disturbance in the orientation of the molecules of the liquid crystals 11a, 11b when the detection takes place. It will be noted that the oscillation frequency can be converted into a corresponding voltage by employing a diode rectifier in combination with a time constant circuit comprising a capacitor and a resistor.

In the sixth embodiment, a change in the orientation of the molecules of the liquid crystals with temperature is detected by the multivibrator in the form of a change in the oscillation frequency. However, instead of using such multivibrator, other means may be used such as an oscillator which includes an LC resonance circuit which employs the capacitance of the liquid crystals as part thereof, thus allowing its oscillation frequency to be detected. Alternatively, the capacitance of the liquid crystals may be used in a resonant circuit which has a given resonance frequency so that the operating point may be displaced from the resonance with temperature, thus allowing a change in the resulting output to be detected. As a further alternative, a change in the orientation of the molecules of the liquid crystals with temperature may be detected in terms of an electric current.

Figure 10:
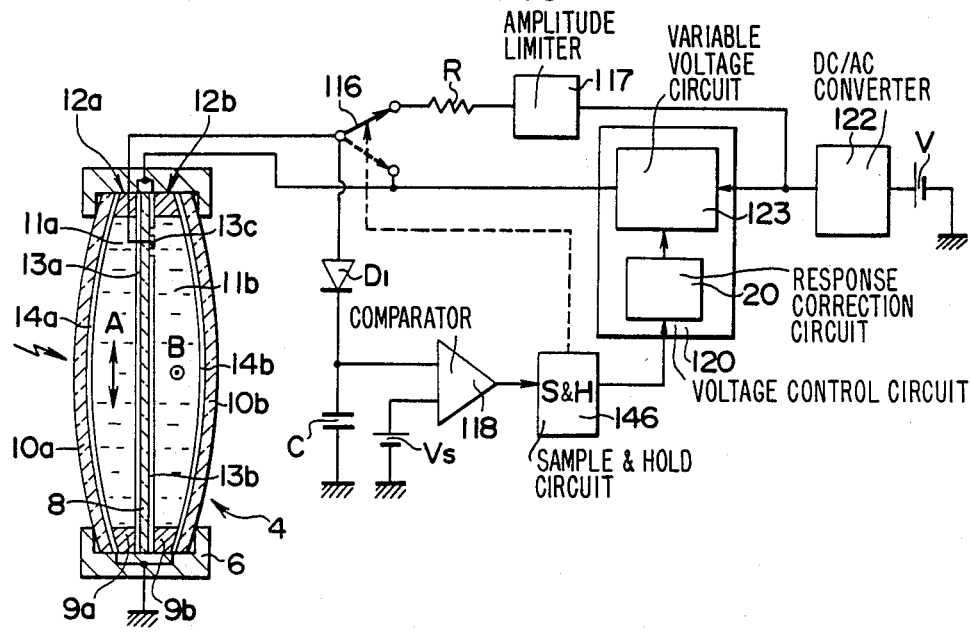
Figure 13:
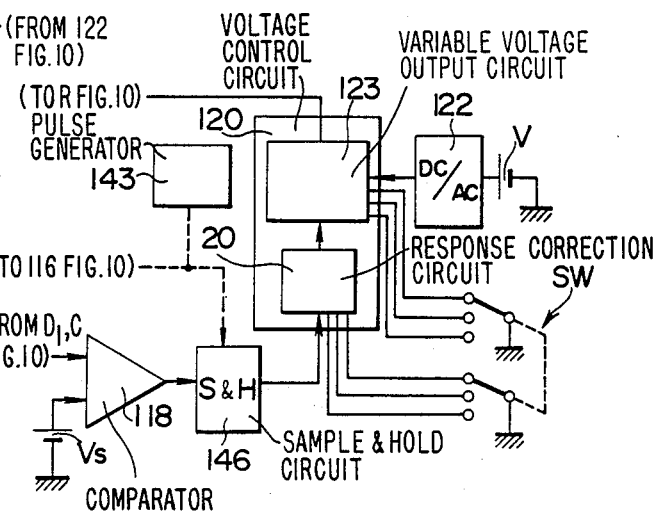
FIGS. 12 and 13 are cross sections, to an enlarged scale, of essential parts of liquid crystal eyeglasses according to eighth and ninth embodiments of the invention together with a schematic diagram of their associated temperature compensation means.
Figure 12:
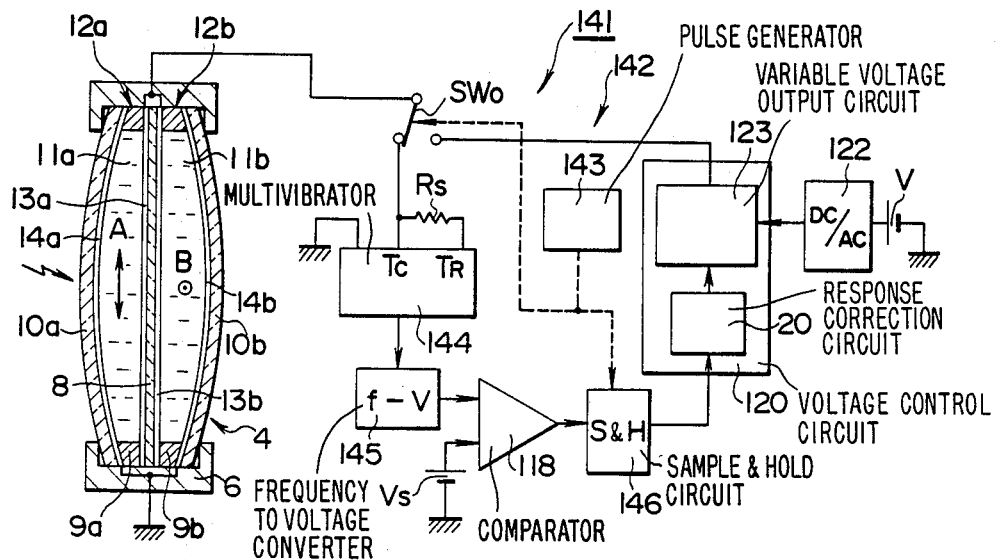

FIG. 10 shows a seventh embodiment of the invention which utilizes means for detecting a physical quantity that varies with a change in the orientation of the molecules of the liquid crystal in combination with voltage control means to provide temperature compensation means, as in an eighth embodiment shown in FIG. 12 and a ninth embodiment shown in FIG. 13.

In the variable focal length lenses 12a, 12b of the seventh embodiment, one of the inner electrodes, for example, 13b, does not extend across the entire surface of the transparent plate 8 on one side thereof, but includes a transparent electrode 13c which is insulated from the electrode 13b for detecting the orientation of the molecules of the liquid crystals, as shown in FIG. 10. In other respects, the arrangement is similar to that of the first embodiment.

In the seventh embodiment, the electrode 13c is normally connected through a switch 116 in common with the non-grounded electrodes 13a, 13b as indicated by broken lines. When the orientation of the molecules is to be detected, the switch 116 is thrown to the other position, whereupon the electrode is connected through a resistor R to the output of an amplitude limiter 117. A DC/AC converter or oscillator 122 feeds the amplitude limiter 117, which provides an a.c. voltage of a given amplitude. It will be noted that the converter 122 is fed from a d.c. supply V such as battery.

As the a.c. voltage is applied, the current flow across the liquid crystal 11b between the electrode 13c and its opposing electrode 14b is detected as an a.c. voltage at the junction with the resistor R, and this a.c. voltage is rectified by a diode D1 and is smoothed by a capacitor C to be converted into a corresponding d.c. voltage which is then inputted to one input of a comparator 118. A reference voltage Vs is applied to the other input of the comparator 118, which then derives an output signal representing a difference between the inputs for application to a sample-and-hold circuit 146. The sample-and-hold circuit 146 is operated by a sampling pulse which is either synchronized with or slightly delayed with respect to the switching operation of the switch 116. In this manner, a sample from the circuit 146 is fed to an applied voltage control circuit 120 including the response correction circuit 20 and a variable voltage output circuit 123. The response correction circuit 20 responds to a sample output from the circuit 146 by assuring that any change in the orientation of the molecules of the liquid crystals or in the refractive indices thereof which result from a temperature change can be properly compensated for. An output from the correction circuit 20 is applied to a control terminal of the variable voltage output circuit 123, which then functions as an electronically variable resistance which controls the amplitude of the a.c. voltage supplied from the DC/AC converter 122.

When a nematic liquid crystal such as PCB is used for the liquid crystals 11a, 11b, it is recognized that in a temperature region around room temperatures, their refractive indices will be reduced with respect to extraordinary rays which have a strong dependency upon the temperature, as the temperature rises, thus increasing the focal length. Such change in the focal distance attributable to the temperature change can be prevented by increasing the refractive index by the application of a reduced voltage applied, thus preventing the focal length from changing in response to a temperature change. Since the temperature normally varies over a range of several tens of degrees, the response correction circuit 20 is designed to provide an accurate compensation against the temperature change over such range.

Assuming that the focal distance varies with temperature change according to the broken line curve a shown in FIG. 4, if a change in the focal length or refractive index with temperature change is detected as a change in the electrical resistance and the output from the comparator 118 is applied through the sample-and-hold circuit 146 directly to the variable voltage output circuit 123 to control the output voltage thereof, the control of the output voltage will provide the results indicated by the phantom line curve b of FIG. 4, preventing a perfect compensation against temperature change from being achieved. However, in the seventh embodiment, the response correction circuit 20 is interposed between the sample-and-hold circuit 146 and the voltage circuit 123 and functions to correct for such a deviation, thus achieving a compensation for or the elimination of influences of such temperature changes, as indicated by the solid line curve c. The comparison against the reference voltage Vs in the comparator 118 is used in order to establish a desired focal length with an applied voltage which results from a zero output from the comparator 118 at a given temperature which may be a substantially median value of the range across which the environmental temperature varies. Accordingly, the temperature compensation means operates on the basis of such temperature so as to provide an effective temperature compensation on either side of this temperature. (Such technique is particularly effective when the response correction circuit 20 is not provided.)

When the seventh embodiment is used in a varying temperature environment, if the refractive indices of the liquid crystals 11a, 11b which form the lens portions 4, 5 change, such change in the refractive indices attributable to the temperature change is detected as a change in the current, and is utilized in the voltage control circuit 120 to provide an applied voltage automatically which has a magnitude appropriate to eliminate the resulting change in the focal length.

In the seventh embodiment, a change in the orientation of the molecules of the liquid crystals, or more accurately, a change in the refractive index, attributable to temperature changes of the liquid crystals 11a, 11b, is detected in the form of a change in the current or a change in the voltage developed across the resistor R for use in the control of the voltage applied in a manner to prevent a change in the focal length from occurring. It is to be noted that such detection occurs periodically at short intervals, and normally the controlled voltage is applied to the electrodes. Accordingly, the magnitude of the current or voltage detected by the electrode 13c reflects the orientation of the molecules of the liquid crystals or the refractive indices thereof which they assume under the condition that the output from the circuit 123 is applied thereto.

Figure 11:
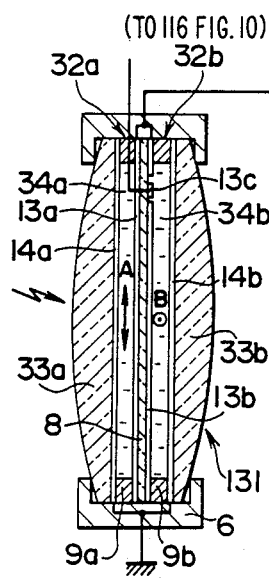
FIG. 11 is a cross section, to an enlarged scale, of essential parts of a modified lens arrangement of a liquid crystal eyeglass.

FIG. 11 shows a modification of a lens portion of the liquid crystal eyeglass which may be substituted for the lens portion 4 of the seventh embodiment. As described above in connection with the second embodiment shown in FIG. 5, each of left and right lens portions 131 (only one being shown) includes a pair of variable focal length lenses 32a, 32b which employ planoconvex lenses 33a, 33b. Thus, the transparent plates 10a, 10b of the variable focal length lenses 12a, 12b shown in FIG. 10 are replaced by the planoconvex lenses 33a, 33b, and liquid crystals 34a, 34b are confined between parallel plates. The liquid crystals 34a, 34b which exhibit variable refractive indices are combined with the planoconvex lenses 33a, 33b to provide the variable focal length lenses 32a, 32b. This arrangement overcomes any difficulty which may result when the liquid crystals 11a, 11b in the form of convex lenses exhibit electric field dependency in addition to voltage dependency, because the liquid crystals 34a, 34b have a uniform thickness throughout.

FIG. 12 shows an eighth embodiment in which the liquid crystal eyeglass 141 utilizes the electrodes 13b, 14b which are used to control the refractive indices, for the purpose of detecting the orientation of the molecules, rather than providing a separate electrode 13c as in the seventh embodiment. Specifically, the liquid crystal eyeglass 141 includes a control circuit 142 including a pulse generator 143 which periodically outputs pulses of a reduced duration. Such pulse is operative to change the switch $SW_O$ to connect the non-grounded electrodes 13a, 13b to a capacitance terminal Tc of an astable multivibrator 144 which is used to detect the capacitance. The multivibrator 144 also includes a resistance terminal $T_R$ to which a resistor Rs of a suitable value is connected. In this manner, the oscillation frequency f of pulses which are outputted from the multivibrator 144 varies in accordance with the values of the resistor Rs and the capacitance of the liquid crystal connected to the terminals $T_R$ and Tc, respectively. Since the resistor Rs has a constant value, the output frequency f changes in accordance with the capacitance or the dielectric constant of the liquid crystals 11a, 11b.

The output from the multivibrator 144 is supplied to a frequency-to-voltage converter 145 which converts an input frequency into a corresponding voltage. The output voltage of the converter 145 is compared against a reference voltage Vs by the comparator 118, in the same manner as mentioned above in connection with the seventh embodiment. In other respects, the arrangement is similar to that of the seventh embodiment and therefore will not be described.

In operation, a periodic pulse having a reduced duration changes the switch $SW_O$, which may be an analog switch, so as to be connected to the multivibrator 144, whereupon the multivibrator 144 outputs a pulse train with a period which depends on the capacitance of the liquid crystals 11a, 11b which are filled between the electrodes 13a, 14a and 13b, 14b. The pulse train is converted into a corresponding voltage by the converter 145, which is then compared against the reference voltage Vs. The difference output therebetween is fed to a sample-and-hold circuit 146 which feeds the voltage control circuit 120. An a.c. voltage from the circuit 120 which depends on the capacitance is applied to both liquid crystals 11a, 11b through the switch $SW_O$ which is then connected to the circuit 120. Because the applied voltage is preselected so as to maintain the refractive index of the liquid crystals 11a, 11b constant, the applied voltage is controlled in a manner to maintain the refractive index constant if a change in the temperature is detected, since such temperature change is detected as a change in the capacitance. Accordingly, the liquid crystal eyeglass 141 according to the eighth embodiment maintains a preset focal distance in the presence of temperature changes.

FIG. 13 shows temperature compensation means according to a ninth embodiment of the invention which permits a plurality of different focal lengths to be preselected (at suitable temperatures) in the general arrangement of either the seventh or the eighth embodiment described above.

Specifically, a switch SW is associated with the voltage control circuit 120 for selecting a particular focal length. A manual operation of the switch SW enables a particular focal length to be selected, combined with the temperature compensation with respect to the selected focal length. To this end, the operating point of the variable voltage output circuit 123 is changed as the switch SW is changed, and the response correction circuit 20 is also ganged with the switch to maintain the selected focal length. In other respects, the arrangement is similar to that of FIG. 12 (or FIG. 10).

Figure 14:
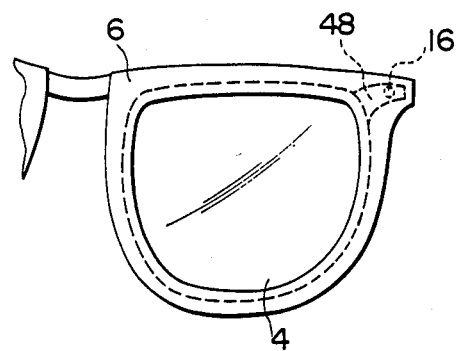
FIG. 14 is a front elevational view illustrating one form of a channel which is used to confine a liquid crystal.

FIG. 14 shows a frame 6 which is provided with a channel 48 for confining a liquid crystal. It is to be understood that the channel 48 is arranged to communicate with each space which is adapted to receive the liquid crystal. Accordingly, the liquid crystal may be introduced into the channel 48 through an end thereof which opens into the side of the frame 6, and then the end may be closed, thus allowing the liquid crystal to be confined in a simple manner. The temperature sensor 16 which is used to control the frequency of the applied voltage in response to the temperature detected may be disposed adjacent to the channel 48. It is to be understood that a substantially circular path shown in broken lines in FIG. 14 indicates the boundary of the space in which the liquid crystal is confined.

Figure 15:
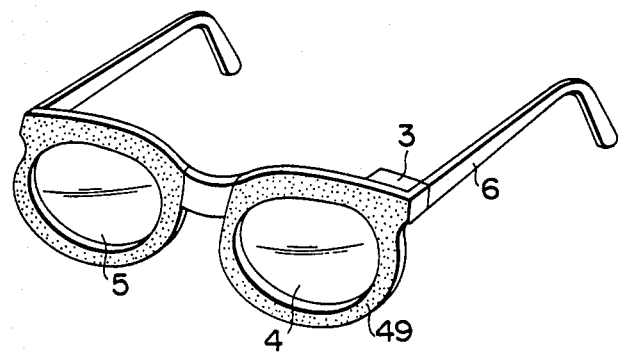
FIG. 15 is a perspective view of liquid crystal eyeglasses including a solar cell which is mounted on the front surface of a lens frame.

FIG. 15 shows another arrangement of the invention in which a solar cell 49 such as formed of an amorphous material is attached to a liquid crystal eyeglass, for example, on the front surface of a lens frame (which is shown as stippled). The solar cell 49 develops a d.c. electromotive force E which charges a d.c. source V for the entire control circuit 3. The charging operation takes place through a back flow preventing diode when the electromotive force E is greater than the voltage across the source V. Where incident light has a low intensity and the electromotive force is less than the source voltage, a DC/AC converter which is operable at a low voltage may be used to provide a booster action, in combination with a rectifier. In addition, these elements may be manually turned on and off. As a further alternative, the magnitude of the electromotive force E may be detected, and the circuit may be automatically switched in response to the detection to charge the source V by the electromotive force E when the latter exceeds the former. Additionally, the electromotive force may be directly used as a power source. It is to be understood that the construction of the left and right lens portions of this arrangement is not limited to the constructions mentioned above, but a construction as illustrated in FIG. 16 may be used.

Figure 16:
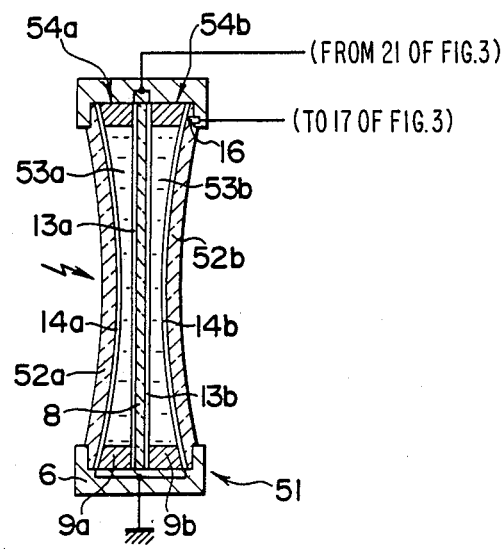
FIGS. 16 to 18 are cross sections, to an enlarged scale, of an essential part of modified lens arrangements of liquid crystal eyeglasses.

Referring to FIG. 16, there is shown a lens portion 51 which may be either left or right lens portion. It will be seen that the transparent plates 10a, 10b shown in FIGS. 3 and 7 are replaced by concave transparent plates 52a, 52b, respectively, and liquid crystals 53a, 53b are confined in spaces defined between transparent plates 8, 52a and 8, 52b, respectively, in the form of concave lenses, thus providing variable focal length lenses 54a, 54b which function as concave lenses. In FIG. 16, the liquid crystals 53a, 53b may be confined in plate-like spaces while transparent plates 52a, 52b may be concave lenses.

Figure 17:
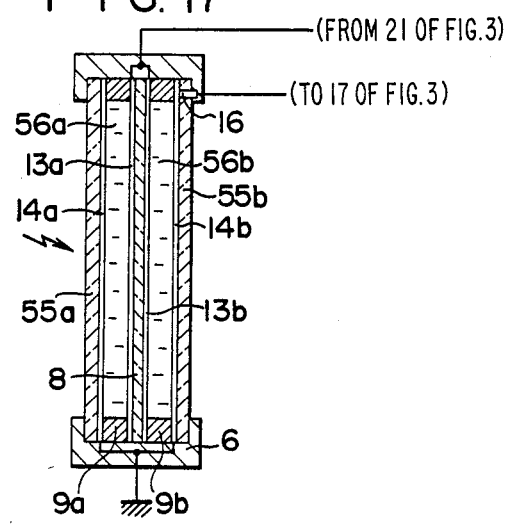
Figure 18:
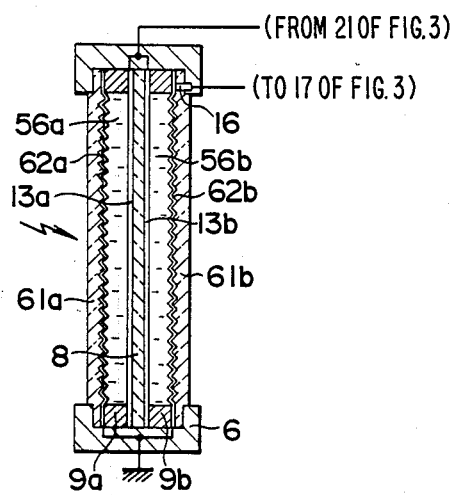

FIG. 17 shows an alternate construction in which transparent plates 8, 55a, 55b in the form of parallel plates define plate-shaped spaces in which liquid crystals 56a, 56b are confined. This construction may be used to provide a focus adjustment for the crystalline humor or the lens defined thereby. The lens portion defined by the construction of FIG. 17 may incorporate a Fresnel structure as shown in FIG. 18. Specifically, both outer transparent plates 55a, 55b of FIG. 17 are replaced by transparent plates 61a, 61b which have triangular unevenness on their inner surface (which is located adjacent to the liquid crystal), with transparent electrodes 62a, 62b defined on the inner surfaces, thus providing a Fresnel structure. Liquid crystals 56a, 56b are confined between the inner surfaces which exhibit such unevenness and the opposite flat plate electrodes 13a, 13b, respectively. Such Fresnel structure enables a rapid response of the orientation of the molecules of the liquid crystals, in particular, those disposed adjacent to the unevenness, in response to an application of a voltage while the remainder of the liquid crystals follow the orientation of the first mentioned molecules, thus achieving a rapid re-orientation as a whole. In this manner, a liquid crystal eyeglass having a good response is achieved.

While FIG. 18 illustrates the application of a Fresnel structure to the construction of FIG. 17, the Fresnel structure may similarly applied to other constructions. In addition, both opposing electrode surfaces may be constructed as a Fresnel structure.

Alternatively, the inside of the planoconvex lenses 33a, 33b shown in FIG. 5, for example, may be shaped to present a concave surface so that they function as concave lenses toward the liquid crystals 34a, 34b. In this manner, a combined concave/convex lens function may be provided.

As a further alternative, the described constructions may be combined in overlapping relationship to achieve a variable focal length lens which has the combined functions acting as a convex lens and a concave lens.

Additionally, the control 3 may be constructed as part of the frame 6. A variable focal length lens may also be constructed using a polarizer. In addition, in the plate-shaped lens portion as illustrated in FIG. 17 or FIG. 18, an array of concentric electrodes may be provided so that slightly different voltages may be applied to these electrodes located toward the center and located toward the periphery, respectively, thereby allowing the lens portion to function as either a convex or a concave lens or providing a variable focal length lens having both functions.

Finally, it should be understood that the construction of the control circuit 3 is not limited to the constructions illustrated in the above embodiments. By way of example, an output from the temperature detecting and processing unit 17 may be directly applied to the voltage control circuit 19 or the frequency control circuit 119, thus simplifying the arrangement, without departing from the scope of the invention.

Incidentally, means for detecting transmittivity may be provided as means for detecting a physical quantity which varies with a change in the orientation of the molecules of a liquid crystal with a temperature change. Thus, an output from such detecting means may be used to control the frequency of the applying voltage. For example, in the arrangement of FIG. 16, a light emitting element and a light receiving element may be disposed in opposing relationship with each other with the liquid crystal 53b sandwiched therebetween at a location toward the periphery of the lens 54b. In this manner, light from the light emitting element may be passed through the liquid crystal 53b to impinge upon the opposing light receiving element, a photoelectric output of which may be used to control the frequency of the applied voltage. Alternatively, the detection of reflectivity may be utilized.

It should be understood that transparent plates and convex lenses which are used in constructing the described lenses are not limited to those formed of glasses, but may be formed of materials such as a plastic material having a relatively high hardness, a plastic material having elasticity or a combination thereof. Alternatively, they may be formed of a material which is capable of accommodating for a thermal expansion or shrinkage of the liquid crystal.

The liquid crystal eyeglass according to the invention may be used by a person who suffers from a reduction in the visibility adjusting capability in order to prevent a temperature change from producing an out-of-focus condition.

In addition to a change in the focusing function, a change in the environmental temperature also causes a fogging of a lens. Specifically, a rapid change in the environmental temperature causes the deposition of a water droplet on the surface of the liquid crystal lens as on a conventional lens, thus causing a difficulty in the sight. In such instance, the lens surface must be wiped by a cloth, which is a major inconvenience in the use of eyeglasses which incorporates liquid crystal lenses.

Figure 19:
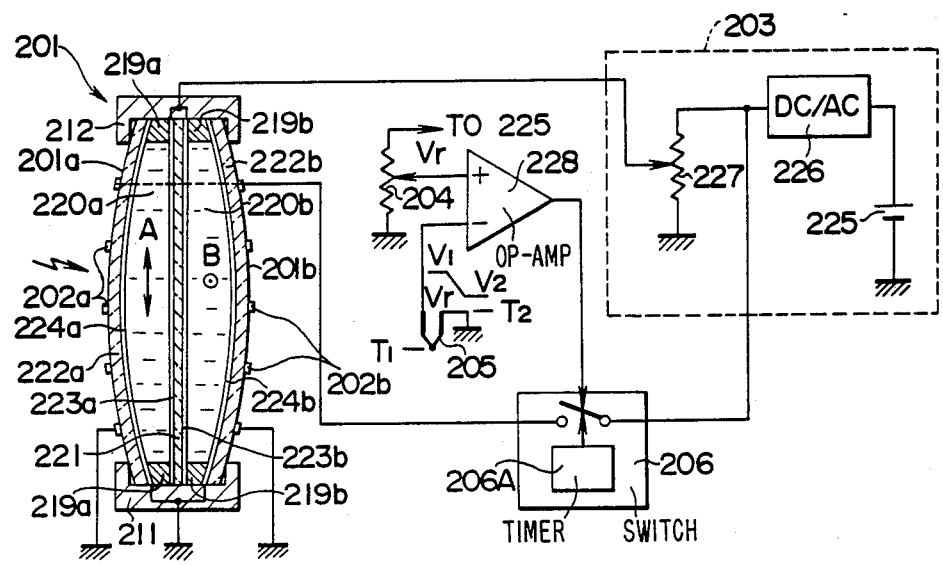
FIG. 19 is a cross section, to an enlarged scale, of an essential part of a liquid crystal eyeglass which includes anti-fogging means, together with a circuit diagram of the anti-fogging means.
Figure 20:
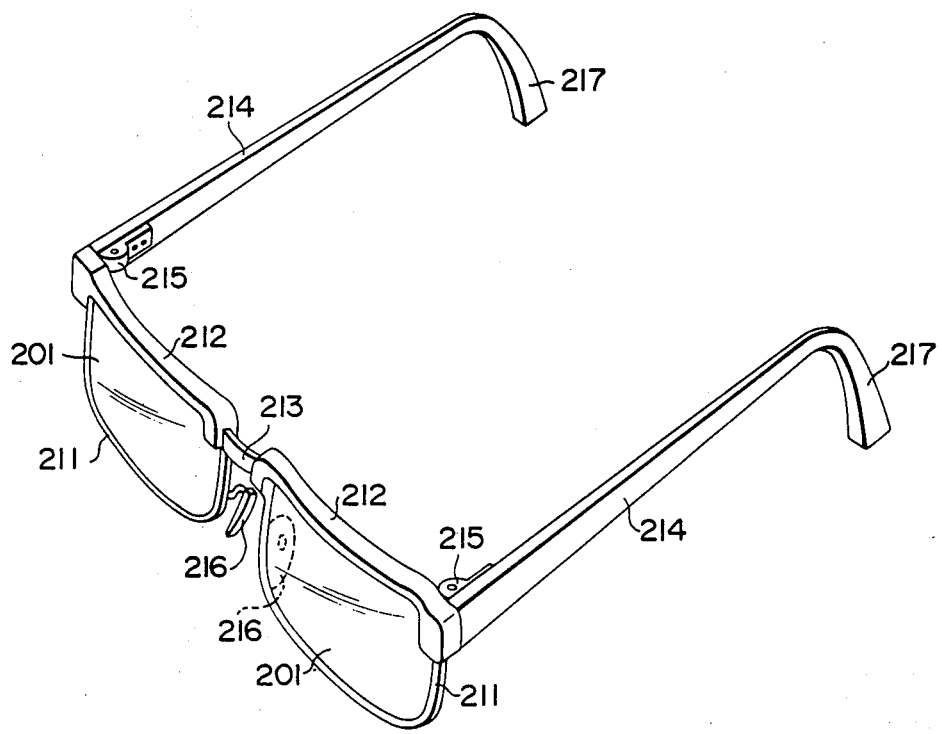
FIG. 20 is a perspective view of liquid crystal eyeglasses including anti-fogging means.

FIGS. 19 and 20 show one form of anti-fogging means for liquid crystal eyeglasses which is developed in accordance with the invention. Specifically, liquid crystal lens 201 has a front and a rear surface 201a, 201b, and the anti-fogging means comprises transparent heaters 202a, 202b which are folded over the front and the rear surface in the form of "blind" and which are energized with an a.c. voltage, for example, from a power supply 203 so as to be heated under a given thermal condition. Means for controlling the heaters 202a, 202b comprises means for detecting a temperature change which includes a thermocouple 205 disposed in an eyeglass pad 216 (see FIG. 20) and a variable resistor 204 which develops a reference voltage against which an output voltage from the thermocouple 205 is compared. A switch 206 which is connected in circuit with the heaters 202a, 202b is controlled by a comparison output of these voltages.

The control means and power supply 203 are disposed in the manner shown in FIG. 20 in implementation. Specifically, referring to FIG. 20, the eyeglasses include a pair of liquid crystal lenses 201, and additionally comprises a pair of rims 211 which provide the lower support, a pair of brows 212, a bridge 213, a pair of temples 214, a pair of hinges 215 by which the temples 214 are pivotally mounted on the brows 212, a pair of pads 216 and a pair of bows 217. The thermocouple 205 is disposed in at least one of the pads 216 so that its sensitive area is located in contact with the nose. The power supply 203 is embedded in one of the bows 217 while the other bow 217 has part of the control means embedded therein.

Referring to FIG. 19, the liquid crystal lens 201 essentially comprises a pair of forward and rearward liquid crystal layers 220a, 220b, each of which is partitioned by a central transparent plate 221 and is also defined by transparent plates 222a, 222b which may have a concave configuration, for example, and are located in contact with the outer surfaces of the liquid crystal layers. It will be appreciated that the combination of the central transparent plate 221 and the forward and rearward transparent plates 222a, 222b act to define spaces in which the liquid crystal layers 220a, 220b are received, by acting in concert with a pair of spacers 219a, 219b which are located around the margin of the liquid crystal layers. In the absence of a voltage applied to the liquid crystal layers 220a, 220b, the molecules of the liquid crystals are aligned in a direction parallel to the transparent plates 221, 222a, 222b, with directors representing the mean orientations of the liquid crystals and which coincide with the respective optical axes of the liquid crystal layers 220a and 220b being orthogonal to each other. In other words, a rubbing treatment or the like is made so that the orientations of the molecules of the liquid crystals in the respective layers 220a, 220b, or the respective direction of the optical axes, are in a direction indicated by a double-ended arrow A and a direction indicated by a direction indicator B which is perpendicular to the direction A, as shown in FIG. 19. Both orientations A and B are orthogonal to the direction of incident light.

A pair of transparent electrodes 223a, 223b are provided on the opposite surfaces of the central transparent plate 221, as by coating $SnO_2$. Also transparent electrodes 224a, 224b are applied to the internal surface of the transparent plates 222a, 222b which are located opposite to the transparent plate 221. The outer electrodes 224a, 224b are connected together and connected to a point of reference potential as by a lead wire. The inner electrodes 223a, 223b are also connected together. An a.c. voltage from the power supply 203 is applied to the inner electrodes 223a, 223b of the liquid crystal lens 201 thus constructed. The power supply 203 comprises a voltage source 225 such as a solar cell, for example, which feeds a DC/AC converter 226, the output of which delivers an a.c. voltage. The a.c. voltage is applied to one end of a variable resistor 227 which has its other end connected to a point of reference potential. A tap on the resistor 227 is connected to the inner electrodes 223a, 223b.

The variable resistor 204 which is used to establish a reference voltage has its one end connected to receive the voltage from the source 225 and its other end connected to a potential of reference potential. A tap on the resistor 204 is connected to a first input of an operational amplifier 228. The thermocouple 205 includes one conductor electrode which is connected to a point of reference potential and other conductor electrode which is connected to a second input of the amplifier 228. The output of the amplifier 228 is connected to an energization switch 206 in order to control the turn-on and -off thereof. One terminal of the switch 206 is connected to the converter 226 to receive the a.c. voltage output therefrom, and supplies the a.c. voltage to the transparent heaters 202a, 202b when the switch is on. The transparent electrodes 202a, 202b are connected in a parallel circuit arrangement having one common electrode which extends through the thickness of the liquid crystal lens 201, as indicated by broken lines, and having the other common electrode connected to a point of reference potential. As shown, the switch 206 internally houses a timer 206A which begins to count the time since the initiation of the energization. After a given time interval, the timer produces an output which resets the switch to terminate the energization.

The operation of the anti-fogging means will now be described. It should be understood that the adjusting of the focal length of the liquid crystal lens 201 takes place by adjusting the variable resistor 227.

(1) Normal use when free from any temperature change.

The liquid crystal lens 201 is not subject to any fogging phenomenon when used either outdoors or indoors over a prolonged period of time as the temperature change is minimal. Accordingly, there is no need to energize the transparent heaters 202a, 202b in order to prevent the fogging phenomenon. In this instance, because there is a great difference between the temperature $T_1$ adjacent to the nose and either outdoor or indoor temperature $T_2$, the thermocouple 205 provides a detection output voltage which drifts around a voltage $V_1$ higher than the reference voltage Vr derived from the tap of the variable resistor 204. Accordingly, the amplifier 228 produces an output voltage of a low level which maintains the switch 206 off.

(2) When shifting from a low temperature to a high temperature environment.

In this instance, the temperature $T_2$ around the lens either approaches or exceeds the nose temperature $T_1$, so that the output voltage from the thermocouple 205 changes from its normal value $V_1$ to a lower voltage $V_2$. Since the reference voltage Vr is established between the voltage $V_1$ and $V_2$, the amplifier 228 which compares $V_2$ against Vr provides an output of a high level, which causes the switch 206 to be changed to its on condition. Accordingly, the a.c. voltage from the converter 226 is applied to the transparent heaters 202a, 202b, which then operate to increase the temperature of the surfaces 201a, 201b of the liquid crystal lens 201, or actually the front and rear transparent plates 222a, 222b. Accordingly, if the prevailing humidity is high enough to form dew (fogging) on the transparent plates 222a, 222b, the heating of these plates prevents the fogging. The interval of energization can be established by the timer 206A.

In this manner, it is possible to warm the liquid crystal lens 201 before the fogging phenomenon begins to occur. Means which detects a change in the environmental temperature is not limited to the thermocouple, but may comprise any other temperature sensor such as a thermistor, temperature detecting resistor or the like. In such instance, a voltage from the source 225 must be applied to the thermistor.

FIG. 21 shows an alternate form of anti-fogging means, and in this Figure, corresponding parts to those shown in FIG. 19 are designated by like reference numerals, and the liquid crystal lens 201 and the power supply 203 are partly omitted from illustration. A feature of this arrangement resides in the fact that the energization switch 206 is controlled by a derivative output representing a change in the environmental temperature. Specifically, a temperature sensor comprises a thermocouple 229, for example, which has its one sensitive point mounted between the brow 212 and the transparent plate 222b as exposed. The respective conductors of the thermocouple 229 are connected to a differentiator circuit 230 including circuit means which maintains the other sensitive point at a given absolute temperature. The output of the differentiator circuit 230 is connected through a diode 231 to a latch 232 of edge triggered type and having a duration which corresponds to the period of the timer 206A mentioned above. The output from the latch 232 is applied to the energization switch 206 to control its on and off condition. By allowing the latch 232 to maintain a derivative output, representing a voltage change attributable to a temperature change, for a given time interval, the occurrence of a fogging on the transparent plates 222a, 222b can be prevented when changing from a low temperature to a high temperature environment. The purpose of the diode 231 is to prevent the switch from being triggered into conduction in response to a derivative output which may be developed when changing from a high temperature to a low temperature environment.

FIG. 22 shows a further form of anti-fogging means, and corresponding parts to those shown in FIG. 19 are designated by like reference numerals and characters in FIG. 22, with the liquid crystal lens 201 and the power supply 203 being partly omitted from illustration.

Specifically, this anti-fogging means comprises a dew sensor 233 disposed on the surface of the liquid crystal lens 201 or on the surface of the rear transparent plate 222b. One end of the dew sensor 233 is connected to the source 225 to receive a voltage therefrom while its other end is connected to a first input of a level comparator 234 and is also connected through a resistor R1 to a point of reference potential. The comparator 234 has a second input which is connected to the junction between a series combination of resistors R2 and R3 across which the source 225 is connected. The output from the comparator 234 is connected to control the on and off condition of the energization switch 206.

With this arrangement, when a dew forms on the surface 201b of the liquid crystal lens 201, there occurs a change in the resistance of the dew sensor 233, whereby the voltage applied to the first input of the level comparator 234 changes. The voltage developed at the junction between the resistors R2 and R3 represents a reference level corresponding to the voltage developed at the junction between the sensor 233 and the resistor R1 when no dew forms. At this time, the comparator 234 provides an output of a low level, for example. Accordingly, when the dew forms and the voltage at the junction between the sensor 233 and the resistor R1 changes (increases), the output from the comparator 234 transitions to a high level, which causes the switch 206 to be turned on, thus energizing the transparent heaters 202a, 202b.

Figure 23:
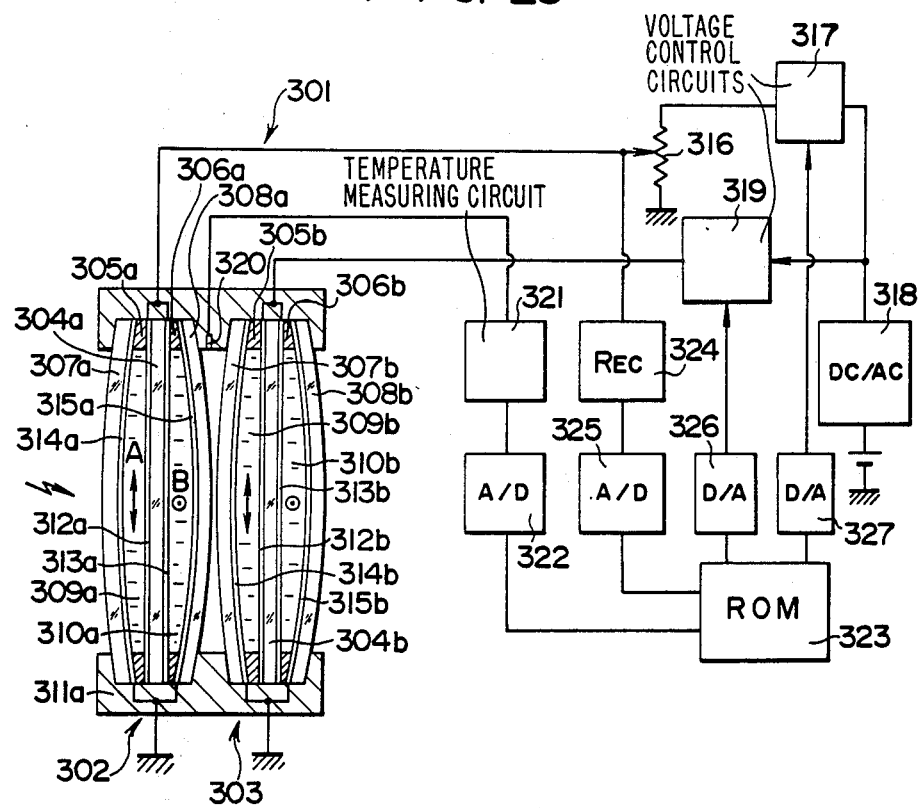
FIG. 23 is a cross section, to an enlarged scale, of an essential part of a liquid crystal lens which has its birefringence compensated against temperature.

As mentioned previously, the orientation of the molecules of the liquid crystal can be controlled by controlling the voltage applied thereto. In this manner, a change in the refractive index which results from a change in the orientation can also be controlled, thus allowing a variable focal length lens to be provided. However, the refractive index of the liquid crystal with respect to extraordinary light rays has a strong temperature dependency, and this causes a large change in the difference of dual refractive indices for birefringence with temperature, presenting a major difficulty when applying the liquid crystal to an optical instrument which requires a level of resolution. FIG. 23 shows a liquid crystal lens according to the invention which has the birefringence compensated for a temperature, maintaining a difference in the refractive indices for birefringence which difference is low and capable of preventing a loss of resolution.

Specifically, a liquid crystal lens 301 comprises a first liquid crystal lens 302 which exhibits a dependency of birefringence upon temperature, in combination with another liquid crystal lens 303 which provides correction. The first lens 302 includes a transparent plate 304a, and a pair of transparent plates 307a, 308a each having a convex surface and which are separated from the respective surfaces of the transparent plate 304a in opposing relationship therefrom, by a pair of annular spacers 305a, 306a which are disposed around the periphery of the plate 304a on the opposite surfaces thereof, thus defining a pair of cells. Liquid crystals 309a, 310a, having an identical response, are confined in the respective cells, and the lens 302 is secured to a frame 311a.

A pair of transparent electrodes 12a, 313a are formed on the opposite surfaces of the plate 304a by utilizing a material such as $SnO_2$, and also a pair of transparent electrodes 314a, 315a are formed on the internal surfaces of the plates 307a, 308a which are disposed opposite to the electrodes 312a, 313a.

The outer electrodes 314a, 315a are connected together and connected to a ground terminal through a lead wire while the inner electrodes 312a, 313a are also connected together and connected through a lead wire to a movable tap on a variable resistor 316 which is used to change the focal length. The resistor 316 has its one end connected to the ground and its other end connected to a DC/AC converter 318 through an interposed voltage control circuit 317.

A nematic liquid crystal, for example, may be used for the liquid crystals 309a, 310a of the lens 302, and as indicated by characters A and B in FIG. 23, the orientation of the molecules of the liquid crystals 309a, 310a are orthogonal to each other, it being understood that a rubbing treatment is applied to the lens so that the orientations A and B are parallel to the surfaces of the electrodes 312a, 313a. Accordingly, the orientations A and B are orthogonal to the optical axis of the lens.

When no voltage is applied to the liquid crystal lens 302, the molecules of the liquid crystals are oriented in orthogonal directions in a plane which is perpendicular to the optical axis of the lens, thus providing a variable focal length lens which does not require a polarizer.

Specifically, incident light can be resolved into a pair of polarization components which are orthogonal to each other, for example, one component having the orientation indicated by the arrow A for the molecules of the liquid crystal 309a and other component having the orientation B for the molecules of the liquid crystal 310a of FIG. 23. When a polarization component which is parallel to the orientation A passes through the transparent plate 307a to impinge on the liquid crystal 309a, this component represents an extraordinary ray to the liquid crystal 309a. Accordingly, when a voltage is applied to the liquid crystal 309a, the molecules of the liquid crystal gradually change their orientation toward a direction which is perpendicular to the surface of the electrode 312a depending on the magnitude of the voltage. Accordingly, the apparent refractive index of the liquid crystal 309a with respect to such extraordinary ray component will continuously change from a value associated with an extraordinary ray to another value associated with ordinary ray, thus producing a variable focal length effect. The component which represents an extraordinary ray with respect to the liquid crystal 309a represents an ordinary ray with respect to the liquid crystal 310a, so that the apparent refractive index of the liquid crystal 310a remains substantially unchanged upon application of a voltage thereto, producing no change in the focal length thereof. Thus such ray passes directly straightforward.

On the other hand, when the other component of the incident ray which represents an ordinary ray with respect to the liquid crystal 309a impinges upon the liquid crystal 309a, the apparent refractive index thereof remains substantially unchanged, producing no change in the focal length. However, such component represents an extraordinary ray with respect to the liquid crystal 310a, the apparent refractive index of which therefore changes in the same manner as occurs in the first instance with respect to the liquid crystal 309a, producing variable focal length effect. Since an equal voltage is applied to both liquid crystals 309a and 310a, the change which occurs in the focal length is equal in each of these liquid crystals. Accordingly, by disposing the liquid crystals 309a, 310a, each of which functions as a variable focal length lens, in overlapping relationship with each other with their optical axes orthogonal to each other, the assembly operates as a variable focal length lens for polarized light of any direction, thus providing a lens, the focal length of which can be changed independently from the direction of polarization of an incident light, without using a polarizer. Stated differently, there is obtained a bright lens which exhibits a high optical efficiency for natural light which does not represent a plane polarization while avoiding the use of a polarizer.

Figure 24:
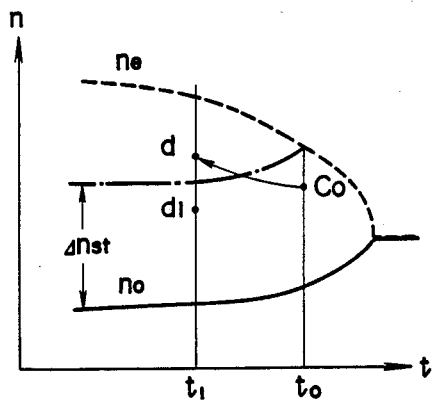
FIG. 24 graphically shows a change in the refractive index with temperature changes.

However, it must be noted that the refractive index $n_O$ with respect to a ordinary ray and the refractive index $n_e$ with respect to an extraordinary ray of the respective liquid crystals 309a, 310a of the liquid crystal lens are different functions of temperature, as graphically illustrated in FIG. 24. It will be noted that the refractive index $n_O$ exhibits little change with the temperature t while the refractive index $n_e$ with respect to extraordinary ray has a strong dependency upon the temperature.

Accordingly, a difference $\Delta n$ between the refractive index $n_O(t_O)$ with respect to the extraordinary ray and the refractive index $n_e(t_O)$ with respect to the ordinary ray, which is equal to $n_e(t_O) - n_O(t_O)$, is relatively small at temperature $t_O$, but the difference $\Delta n$ increases significantly at temperature $t_1$. As a result of the difference $\Delta n$ in the refractive indices, there is produced a large deviation between optical paths which the extraordinary and the ordinary ray follow when passing through the liquid crystal 309a. This deviation will be greatly improved or offset when the light passes through the next liquid crystal 310a since then the ordinary and the extraordinary ray will be interchanged. However, for a ray having a large angle of incidence, there will be a great difference between a path through the liquid crystal 309a and another path through the liquid crystal 310a, making it impossible to sufficiently remove the difference $\Delta n$ in the refractive indices.

To accommodate for this, the liquid crystal lens 303 is used to provide a correction. It will be noted that the correction lens 303 is constructed in a manner similar the liquid crystal lens 302, and accordingly, corresponding parts are designated by like reference numerals as used with the liquid crystal lens 302, but in which the postfix "a" is replaced by "b". Specifically, the liquid crystal lens 303 has inner electrodes 312b, 313b which are connected to the DC/AC converter 318 through an interposed voltage control circuit 319. A temperature sensor 320 is mounted on the liquid crystal lens 302 (or alternatively on the liquid crystal lens 303), and provides an output signal which is fed to a temperature measuring circuit 321, an output signal of which is fed to an A/D converter 322. A digital signal from the converter 322 is inputted to ROM 323.

The a.c. voltage applied to the liquid crystal lens 302 is rectified by a rectifier 324, a d.c. output voltage of which is converted into a digital signal by an A/D converter 325 and then inputted to ROM 323. It is to be understood that ROM 323 stores data which is used to establish a.c. voltages to be applied to the respective liquid crystal lenses 302, 303 in response to an address signal applied to address terminals thereof. A pair of output data which are read from ROM 323 are fed through D/A converters 326, 327 to control terminals of voltage control circuits 317, 319, respectively. It will be appreciated that each of the voltage control circuits 317, 319 is constructed to control the amplitude of the a.c. output voltage from the DC/AC converter 318 in accordance with signals which are applied to their respective control terminals.

Specifically, the voltage control circuit 317 is constructed in a manner such that when the temperature t falls, it responds to an output from the temperature sensor 320 by increasing the level or amplitude of the a.c. output voltage therefrom so that the refractive index $n_e$ with respect to the extraordinary ray be reduced, thus enabling the difference $\Delta n$ in the refractive indices to be reduced.

On the other hand, an analog signal which is applied to the control terminal of the other voltage control circuit 319 is chosen to compensate for a change which occurs in the focal length of the liquid crystal lens 302 as a result of the applied voltage thereto which is changed in order to reduce the difference $\Delta n$.

In operation, it may be initially assumed that the refractive index of the liquid crystal lens 302 with respect to the extraordinary ray is indicated by a value $C_O$ shown in FIG. 24 when the temperature t is equal to $t_O$ and the variable resistor 316 is set for a given value. (It may be assumed that there is no change in the refractive index with respect to the ordinary ray as the applied voltage changes.) When the environmental temperature t has fallen from temperature $t_O$ to temperature $t_1$, the refractive index changes from $C_O$ to a value indicated by d if the condition of the voltage control circuit 317 is maintained.

However, a temperature change is detected by the temperature sensor 320, and accordingly, the voltage applied to the control terminal of the voltage control circuit 317 is reduced in a corresponding manner, thus causing the amplitude of the output voltage to be increased, whereby the refractive index is changed from the point d to a point $d_1$. In this manner, the difference $\Delta n$ can be reduced within a range $\Delta n_{st}$ which is indicated by phantom line. When the refractive indices changes to a value $d_1$, the focal length of the liquid crystal lens 302 will be reduced from the focal length which it exhibits at temperature $t_O$ (or the focal length may increase). Such change is compensated for by the liquid crystal lens 303.

Specifically, a signal which is to be applied to the control terminal of the voltage control circuit 319 is outputted from ROM 323 in paired relationship with a signal applied to the control terminal of the voltage control circuit 317. As a result, the amplitude of the a.c. voltage which is outputted from the voltage control circuit 319 is changed to vary the focal length of the liquid crystal lens 303 in a manner to compensate for a change in the focal length of the liquid crystal lens 302 when the difference 66 n in the refractive indices is kept within a permissible range.

At this time, within the correction lens 303, a difference $\Delta n$ between the refractive index $n_e$ with respect to the extraordinary ray and the refractive index $n_O$ thereof with respect to the ordinary ray is kept within a permissible range. It is desirable that the difference $\Delta n$ be maintained sufficiently small.

As a result of the described arrangement, an increase in the difference of refractive indices with temperature can be prevented, thus allowing the resolution to be increased.

In the arrangement of FIG. 23, the liquid crystal lens 302 is employed as an optical lens, the birefringence of which is to be compensated for. However, a similar compensation can be achieved for an optical lens which employs an optoelectrical element, by utilizing a correction lens 303 in combination.

What is claimed is:

1. A liquid crystal eyeglass comprising:
   an eyeglass frame having a frame portion for at least partially surrounding a lens;
   at least one lens assembly supported within said frame portion having a predetermined effective aperture and including a liquid crystal having a refractive index which varies as a result of a change in the orientation of molecules of a liquid crystal responsive to the application of an external voltage;
   means for detecting the temperature of the liquid crystal comprising a temperature sensor disposed upon the portion of the frame surrounding said lens assembly and outside of said predetermined effective aperture, said detecting means further including temperature detecting and processing means for generating a compensating signal;
   comparison means for generating a differential signal representing a deviation of said compensating signal from a known signal value; and
   voltage control means for controlling the voltage applied to the liquid crystal responsive to a control output from the comparison means, for controlling the orientation of the liquid crystal to compensate for a change in the refractive index of the liquid crystal due to a change in temperature.

2. A liquid crystal eyeglass according to claim 1 in which the temperature sensor comprises one of the temperature sensors of a group including a thermistor, a thermocouple, a temperature measuring resistor and a temperature measuring impedance.

3. A liquid crystal eyeglass according to claim 1 further including a solar cell mounted upon the surface of a portion of the frame surrounding said liquid crystal for charging a power supply used to power the detecting means and the voltage control means.

4. A liquid crystal eyeglass according to claim 1 in which said liquid crystal eyeglass comprises a pair of spaced transparent plates;
   a common transparent plate positioned between said pair of spaced transparent plates dividing the region between said pair of plates substantially evenly into first and second interior regions;
   and sealing means for liquid tightly sealing said interior regions, said interior regions each containing a liquid crystal;
   the crystals having their optical axes orthogonal to each other and orthogonal to the optical axis of the lens to provide a variable focal length lens for providing a change in focal length independently of the direction of polarization of the incident light.

5. A liquid crystal eyeglass according to claim 4 wherein transparent electrodes are arranged on both surfaces of said common transparent plate and upon the interior surfaces of said pair of transparent plates; and
   means for coupling said voltage control means to selected ones of said transparent electrodes.

6. A liquid crystal eyeglass according to claim 5 in which said transparent plates are flat planar members.

7. A liquid crystal eyeglass according to claim 4 wherein said common transparent plate is provided with a sensing transparent electrode provided on one surface thereof and electrically insulated from the first mentioned transparent electrode on said one surface;
   said detecting means being coupled to said sensing electrode for detecting a characteristic of the liquid crystal which changes as a function of temperature.

8. A liquid crystal eyeglass according to claim 7 further comprising means for periodically coupling said sensing electrode to said temperature detecting means.

9. A liquid crystal eyeglass according to claim 4 in which the interior surfaces of said pair of transparent plates each have a Fresnel structure, said electrodes being deposited upon said Fresnel structure.

10. A liquid crystal eyeglass according to claim 1 in which the voltage control means is formed by a voltage control circuit including a temperature change response correction circuit and a variable voltage output circuit.

11. A liquid crystal eyeglass according to claim 1 in which the voltage control means includes a plurality of control inputs each associated with a focal length and signal switching means for selectively coupling a reference level to one of said control inputs which permits one of a plurality of said focal lengths to be established for the liquid crystal eyeglass.

12. A liquid crystal eyeglass employing a liquid crystal having a refractive index which varies as a result of a change in the orientation of molecules of the liquid crystal in response to the application of an external voltage, comprising:
   means for detecting the temperature of the liquid crystal;
   voltage control means for controlling the voltage applied to the liquid crystal in response to a detection output from the temperature detecting means, thereby controlling the orientation of the liquid crystal to compensate for a change in the refractive index of the liquid crystal due to a temperature change;

said voltage control means being formed by a voltage control circuit including a temperature change response correction circuit and a variable voltage output circuit;

said variable output circuit controlling the amplitude of an AC output voltage supplied from a power supply in accordance with the level of a control voltage which is applied to a control terminal thereof.

13. A liquid crystal eyeglass employing a liquid crystal having a refractive index which varies as result of a change in the orientation of molecules of the liquid crystal in response to the application of an external voltage comprising:

means for detecting one of the characteristics of the liquid crystal including the temperature and the orientation of the liquid crystal; and means for controlling the frequency of the voltage applied to the liquid crystal in response to a detection output from the detecting means, whereby the orientation of the liquid crystal is controlled to compensate for a change in the refractive index of the liquid crystal due to a temperature change.

14. A liquid crystal eyeglass according to claim 13 in which the temperature detecting means comprises a temperature sensor taken from the group including a thermistor, a thermocouple, a temperature measuring resistor, a temperature measuring impedance and a temperature detecting and processing unit.

15. A liquid crystal eyeglass according to claim 13 in which the orientation detecting means comprises means for detecting a capacitance representing a physical quantity which varies with a change in the orientation of molecules of the liquid crystal.

16. A liquid crystal eyeglass according to claim 13 in which the frequency control means is formed by a frequency control circuit including a temperature change response correction circuit, and a variable frequency output circuit which delivers oscillation waves of a frequency which depends on the level of a voltage applied to an input terminal thereof.

17. A liquid crystal eyeglass according to claim 16 in which an input to the frequency control circuit is supplied from a control means comprising an analog switch, a multivibrator for delivering output pulse waves having an oscillation frequency which depends on the values of a resistor connected to a resistance terminal thereof and a capacitance connected to a capacitance terminal thereof, the analog switch being operated by an output pulse from a pulse generator to connect a non-grounded electrode of the liquid crystal lens to the capacitance terminal of the multivibrator, said control means also comprising a frequency-to-voltage converter for converting the frequency of the output pulse waves from the multivibrator into a corresponding voltage, a sample-and-hold circuit for sampling and holding an output voltage from the converter, and a comparator for comparing an output voltage from the sample-and-hold circuit against a reference voltage.

18. A liquid crystal eyeglass according to claim 13 in which the frequency control means includes a plurality of control inputs each associated with a focal length and signal switching means for selectively coupling a reference level to one of said control inputs to control the output frequency of said frequency control means which permits one of a plurality of said different focal lengths to be established for the liquid crystal eyeglass.

19. The liquid crystal eyeglass of claim 13 wherein said detecting means comprises a multivibrator coupled to said liquid crystal for generating an output signal whose frequency varies with changes in the impedance of the liquid crystal due to changes in temperature.

20. The liquid crystal eyeglass of claim 19 wherein said converter means is a frequency-to-voltage converter.

21. A liquid crystal eyeglass employing a liquid crystal arranged in an eyeglass frame and having a varying refractive index as a result of a change in the orientation of molecules of the liquid crystal in response to the application of an external voltage, comprising:

means for detecting a physical quantity which varies with a change in the orientation of molecules of the liquid crystal;

voltage control means for controlling the voltage applied to the liquid crystal in response to a detection output from the detecting means, thereby compensating for a change in the refractive index of the liquid crystal which occurs responsive to a change in temperature;

said means for detecting a physical quantity comprising one of the means taken from the group consisting of means for detecting a current flow through the liquid crystal and means for detecting a capacitance which varies with a change in the orientation of molecules of the liquid crystal; and said voltage control means being formed by an applied voltage control circuit including a temperature change response correction circuit, and a variable voltage output circuit for controlling the amplitude of an AC voltage supplied from a DC/AC converter in accordance with the level of the control voltage applied to said variable voltage output circuit.

22. A liquid crystal eyeglass according to claim 21 in which an input to the applied voltage control circuit is fed from a control means comprising an analog switch, a multivibrator for delivering output pulse waves of an oscillation frequency which is determined by the value of a resistance and a capacitance connected to a resistance terminal and a capacitance terminal thereof, the analog switch being operated by an output pulse from a pulse generator to connect a non-grounded electrode of the liquid crystal lens to the capacitance terminal of the multivibrator, said control means also comprising a frequency-to-voltage converter for converting the frequency of the output pulse waves from the multivibrator into a corresponding voltage, a comparator for comparing an output voltage from the converter against a reference voltage, and a sample-and-hold circuit for sampling and holding an output voltage from the comparator.

23. A liquid crystal eyeglass including:

a frame;

a liquid crystal mounted on said frame and having control electrodes and exhibiting a varying refractive index as a result of a change in the orientation of molecules of the liquid crystal in response to the application of an external voltage from a source mounted on said frame and coupled to said control electrodes;

means for detecting a physical quantity which varies with a change in the orientation of molecules of the liquid crystal;

voltage control means for controlling the voltage applied to the liquid crystal in response to a detection output from the detecting means, thereby compensating for a change in the refractive index of the liquid crystal which occurs in response to a temperature change;

pulse generator means;

analog switch means for alternately coupling said detecting means and said voltage control means to said liquid crystal at a repetition rate determined by said pulse generator means, whereby said liquid crystal is alternately powered and monitored in a continuing, repetitive manner; and said applied voltage control means includes a plurality of control inputs each associated with a focal length and signal switching means for selectively coupling a reference level to one of said control inputs which permits one of a plurality of said different focal lengths to be established for the liquid crystal eyeglass.

* * * * *

UNITED STATES PATENT AND TRADEMARK OFFICE
CERTIFICATE OF CORRECTION

PATENT NO. :   4,919,520

DATED      :   April 24, 1990

INVENTOR(S) :  Okada et al.

It is certified that error appears in the above-identified patent and that said Letters Patent is hereby corrected as shown below:

On the title page:

In the List of Inventors: "Hiroyuki Yamamoto" should be -- Hiroyuki Yoshimori --

Column 2, line 6, "cove" should be --cover--

Column 3, line 33, after "axes" insert -- ) --

Column 18, line 36, "12a" should be --312a--

Column 19, line 65, "An" should be -- $\Delta$n --

Column 21, line 24, "66n" should be -- $\Delta$n --

Signed and Sealed this

Twenty-first Day of May, 1991

Attest:

HARRY F. MANBECK, JR.

*Attesting Officer*          *Commissioner of Patents and Trademarks*